United States Patent [19]

Haynes

[11] 4,318,141
[45] Mar. 2, 1982

[54] BURIED SERVO RECORDING SYSTEMS AND METHODS

[75] Inventor: Munro K. Haynes, Tucson, Ariz.

[73] Assignee: International Business Machines Corp., Armonk, N.Y.

[21] Appl. No.: 101,380

[22] Filed: Dec. 7, 1979

[51] Int. Cl.³ .............................................. G11B 21/10
[52] U.S. Cl. ...................................... 360/77; 360/131
[58] Field of Search ....................... 360/77, 76, 73, 70, 360/75, 131

[56] References Cited

U.S. PATENT DOCUMENTS 3,404,392 10/1968 Sordello ................................ 360/77
3,534,344 10/1970 Santana .................................. 360/77
3,845,500 10/1974 Hart ................................... 360/76 X

OTHER PUBLICATIONS

IBM/IDB vol. 17, No. 2, Jul. '74, "Recording Servo Info. Below a Data Surface . . . ", by Schwarz.

Primary Examiner—John H. Wolff
Attorney, Agent, or Firm—Herbert F. Somermeyer

[57] ABSTRACT

A single-gap transducer simultaneously senses recorded control or servo signals and record data signals. A magnetic medium used with this invention is preferably a single layer magnetic medium. The head gap length and pole-tip face length allow different portions of the pole pieces in a magnetic transducer to be utilized during the simultaneous read and record operations. The servo signals are preferably deep and hard recorded into the layer whereas the data signals are preferably pulse width limited and recorded adjacent the surface portion of the magnetic layer.

26 Claims, 6 Drawing Figures

BURIED SERVO RECORDING SYSTEMS AND METHODS

CROSS-REFERENCES TO CO-FILED COMMONLY-ASSIGNED PATENT APPLICATIONS

Cheatham et al Ser. No. 101,349 filed Dec. 7, 1979 shows a preferred method of recording a control signal to be used in practicing the present invention.

Kiedl Ser. No. 101,379 filed Dec. 7, 1979 discloses and claims an invention related to the present application.

DOCUMENTS INCORPORATED BY REFERENCE

U.S. Pat. No. 3,534,344 shows a disk-type recorder with a servo controlled head positioner usable to position a transducer in accordance with a position error signal PES generated using the present invention.

U.S. Pat. No. 3,845,500 shows a rotating head tape recorder using tape to head servo positioning which may use a position error signal PES generated using the present invention.

BACKGROUND OF THE INVENTION

The present invention relates to recording systems and particularly to those systems employing continuous buried servos for faithful track following operations to enable high track densities with high lineal densities.

It has long been recognized that, if a servo signal—i.e., a track location indicating signal, could be superposed with a data signal, higher areal density recording can be more easily achieved with a high degree of faithful reproduction. Even though such techniques have been known to be desirable, they have never been commercially exploited, apparently because of the degradation of the so-called buried servo or track-position indicating signals or the expense of providing a multiple layer magnetic coating, one for the position indicating signals and another for the data signals.

An early teaching of superposed data and servo signals is found in the F. J. Sordello U.S. Pat. No. 3,404,392. This patent teaches using a dual layer magnetic coating on a disk substrate. A lower layer has a higher retentivity and coercivity than an upper layer. A servo signal is first recorded in the lower layer for indicating track positions. Following such recording, data signals were recorded. Then both the servo and data signals were sensed. There was no recording based on sensing the servo signals. For each data recording operation, an erase gap preceded a read/write gap so that the data signals could be successfully recorded in the upper layer. During readback not only were the data signals read back by a single gap, but also two sets of servo signals were simultaneously read back. The Sordello servo signals were linearly recorded sine waves written in concentric circular tracks and exhibiting a low frequency. Adjacent servo tracks were written at different frequencies. Each data track was defined as being superposed over one-half of an odd numbered servo track and one-half of an even numbered servo track. Sordello teaches that the data signals and the servo signals must exist in the magnetic medium independently of the other. Sordello also teaches that in a dual layered record medium recording the data signals at a high frequency, at least three or four times the frequency of the servo signals in the lower layer, enables the data signals to be separated from the servo signals by filtering. The independence requirement was met by Sordello providing a record disk having a lower level with a higher coercivity than an upper data signal lever. This arrangement allowed the servo signals to remain undisturbed by subsequent writing and rewriting of data signals in the upper layer. The single gap in the Sordello recorder was significant for purposes of having perfect alignment for simultaneously reading the control or servo signals with the data signals.

A later development in the quest for achieving buried servo operation is shown in T. A. Schwarz in the IMB Technical Disclosure Bulletin, Vol. 17, No. 2, July 1974, beginning of page 536. Schwarz shows a single magnetic coating on a substrate. Schwarz teaches that the ratio of the frequency of the data signals to the servo signal should be 10:1 and that the servo signal can be successfully recorded with a head having sufficient ampere-turns capability. As is turns out, what is needed is "hard" recording achievable not by ampere-turn ratios but by gap length ratios. Accordingly, the Schwarz system apparently resulted in degradation of the servo layer each time data signals are recorded thereon including repeated erasures. It also should be noted that Schwarz teaches it is necessary to erase before rerecording data signals. The present invention avoids this requirement, thereby provides a lower cost recorder.

The Schwarz article also goes into mathematics which apparently is for thin magnetic coating. It is applicant's experience that thin magnetic coatings have not been successfully used with respect to buried servo recordings. The present invention teaches that that a relatively thick magnetic coating should be employed. Schwarz also suggests the use of DC bias recording. Applicant's experience shows that this results in signal distortions that are undesirable in the present inventive system. Schwarz also teaches that the servo signal amplitude should be 25% of the data signal amplitude—i.e., broadly less than the data signal amplitude. Applicant's invention provides a servo readback signal which has an amplitude broadly similar to or greater than the data signal amplitude. This increased servo signal amplitude provides an improved track following and seeking system. Accordingly, Schwarz used separate gaps for data and servo.

With regard to thick and thin media, generally thin media is that record coating wherein all recorded signals normally penetrate the entire depth of the layer. In thick media the penetration is less than the entire depth of the layer for the gap lengths that may be used in connection with recording data signals.

M. R. Cannon in U.S. Pat. No. 3,765,005 teaches using a clock-bias signal at the upper end of a data signal frequency spectrum. Also U.S. Pat. No. 3,821,798 shows a low frequency control signal recorded at a lower end portion of the data signal pass band.

A later reference showing buried servo is Beecroft et al U.S. Pat. No. 3,956,769. Beecroft et al teach the use of two separate gaps in a transducer; one for servo signals and one for data signals. The present invention obviates the requirement for the separate gaps.

SUMMARY OF THE INVENTION

It is an object of the present invention to provide an improved "buried" control signal recording system and apparatus.

In accordance with the invention, a magnetic recorder has a single-gap magnetic transducer adapted to exchange signals with an adjacent magnetic record medium. The record medium has a hard recorded control signal. The term "hard recorded" means that the signal exhibits a retentivity characteristic exemplified by signals recorded using a head having an effective gap length greater than a gap length to be used with subsequent data signal recordings. The control signal is preferably but not limited to a narrow-band low-frequency sinusoidal type signal. The single-gap transducer is connected to a recording means having high-pass frequency characteristics for supplying information-bearing signals to the transducer for recording same on the adjacent magnetic surface. Also connected to the transducer is a control signal circuit having low-pass frequency characteristics and connected to the transducer for receiving sensed control signals simultaneously while the write means is supplying the information-bearing signals for recording. The operation may be enhanced by an AC bias means connected to the transducer for supplying an AC bias signal simultaneously with said recording and sensing operations. The recorder also has an information-bearing signal readback circuit.

THE DRAWING

DETAILED DESCRIPTION

Figure 1:
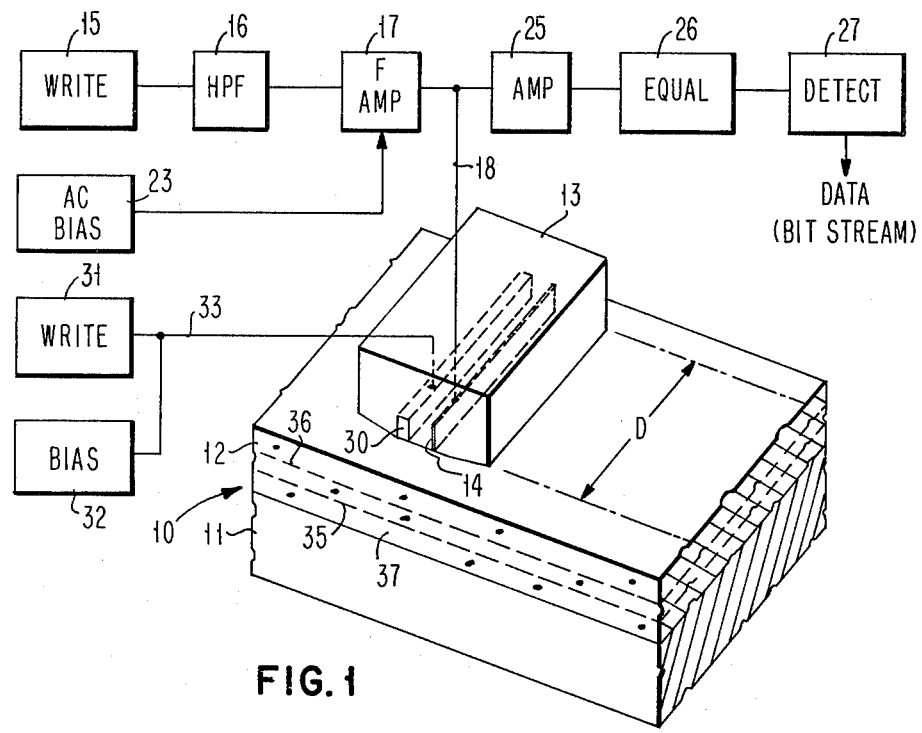
FIG. 1 is a diagrammatic showing of apparatus employing the present invention, particularly illustrating the thick media coatings aspects thereof.

Referring now more particularly to the drawing, like numerals indicate like parts and structural features in the various diagrams. A magnetic record medium 10 consists of a suitable substrate 11 supporting a magnetic coating 12. Coating 12 can be any usual magnetic coating, preferably a magnetic oxide, no limitation thereto intended. Substrate 11 can be in either a tape, disk, card or other shape.

Transducer 13 scans a data track D along the surface of coating 12. A single read/write gap 14 faces coating 12 for enabling transducing operations, as is well known. The length of gap 14—i.e., the length as measured along the longitudinal direction of track D, is designed to operate with the data signal frequencies to be exchanged with coating 12, as later described.

A data recording operation begins with a write circuit 15, constructed in a usual manner, supplying a bit stream representative of data to high pass filter HPF 16. HPF 16 may in fact remove most of the low-frequency energy from the bit stream leaving the bit stream as a series of "spikes" or narrow pulses representative of the transitions between signal levels in the bit stream. In fact, the operation of HPF 16 may be compared favorably to that of a differentiator. The high frequency passed signals from HPF 16 then travel through final amplifier 17, thence over lead 18 to a winding (not shown in FIGS. 1, 2) within transducer 13 and magnetically coupled to magnetic coupling 12 via pole pieces 20, 21 and gap 14. Final amplifier 17 also receives an AC bias signal from AC source 23 for linearly recording the data signals as well as providing a control effect on pole pieces 20 and 21, as hereinafter described.

A readback circuit is also connected to lead 18 for receiving signals sensed by transducer 13 from coating 12. The readback circuit includes an initial amplifier 25 which supplies amplified signals to an equalizing and filtering circuit 26. A detector 27 receives the equalized and filtered signals and converts same to a bit stream identical to the bit stream supplied by write circuit 15.

A recorder employing the present invention uses a so-called buried servo or track positioning indicating signal. For data signal recording purposes, it can be assumed that such position indicating signals have already been recorded in coating 12.

To explain how such position indicating signals are recorded through a second gap 30 of head 13 is shown in the FIG. 1 illustration. The windings associated with gap 30 are not shown. Gap 30 has a substantially greater length along the track D than the read/write gap 14. Accordingly, the position indicating signals recorded with an appropriate signal amplitude through gap 30 are recorded more deeply and harder within coating 12 than signals recorded via read/write gap 14. Servo write circuit 31, which may or may not be connected with an AC bias circuit 32, supplies position indicating signals over lead 33 to be recorded via long gap 30. After such signals are recorded, an erase signal (not shown or otherwise described) erases a surface portion of coating 12, extending into coating 12 as indicated by dashed line 35. Subsequent data recording via gap 14 preferably will go to dashed line 36, no limitation thereto intended. In fact in a practical embodiment, there are no distinct lines demarking the difference between the servo or position indicating signal portion recording which is generally denoted diagrammatically as being in the bottom portion 37 of coating 12, and the portion of coating 12 occupied by the gap 14 recorded signals. The initial erasure reduces the amount of remanence in coating 12 representing the position indicating or servo signals. This surface erasure has a stabilizing effect on the recorded position indicating signals such that repeated data recording via gap 14 does not continually degrade the recorded position indicating signals. Data signals now can be recorded, read back, and re-recorded without intervening erasures.

Figure 2:
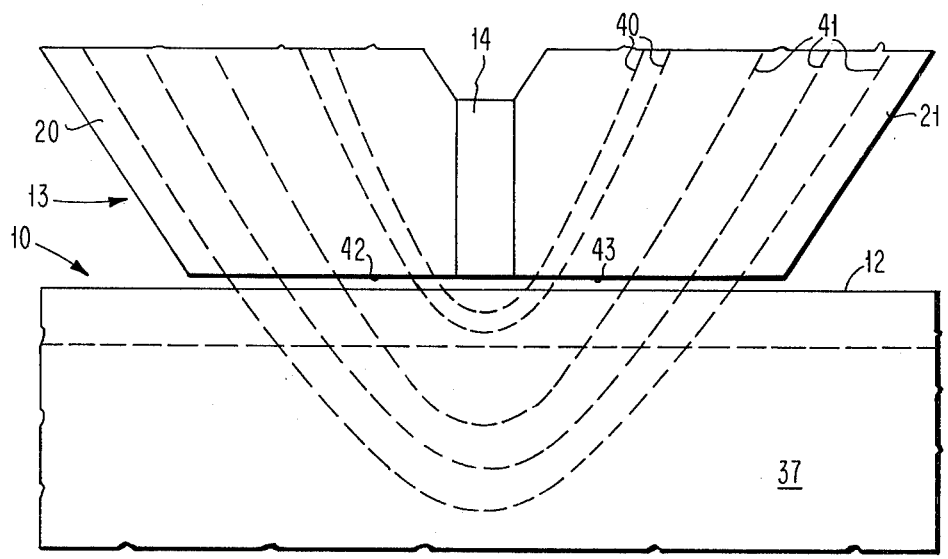
FIG. 2 is a diagrammatic showing of a transducer illustrating flux paths during the simultaneous read and write operation using a single gap transducer.
Figure 3:
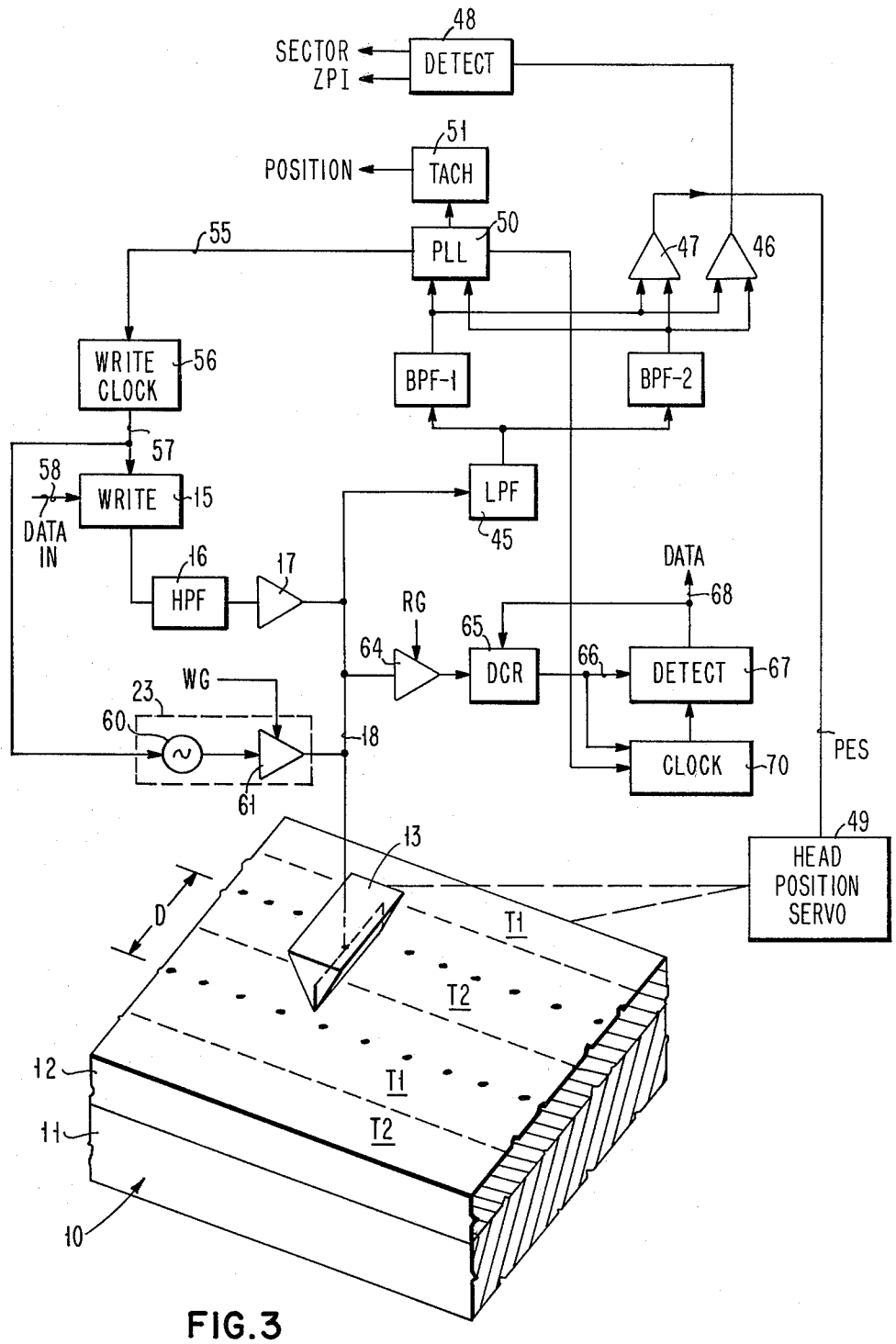
FIG. 3 is a diagrammatic illustration of a multiple track recorder employing the present invention.

In a transducer 13 used with a magnetic medium 10 already having the position indicating signals recorded as above described, uses a single gap 14 in two modes of operation. The first mode of operation of use is for recording data signals are recorded via gap 14 simultaneously with the position indicating signals being sensed. An apparatus for such an operation is shown in FIG. 3. The second mode of operation is the simultaneous sensing of the recorded data signals and the recorded servo signals all through gap 14. FIG. 2 illustrates how these operations are believed to occur without interference. Transducer 13 is shown in close position with magnetic medium 10. Dashed lines 40 represent the magnetic flux paths in pole pieces 20, 21 associated with the reading and recording of data signals while dashed lines 41 diagrammatically represent the flux paths for the servo or position indicating signals in pole pieces 20, 21. It is believed that because of the short gap length 14, the higher frequency flux paths are shorter and remain closer to gap 14. The lower frequencies of the servo or control signals which are preferably single frequency sinusoids, follow the outer flux paths 41. Note that the lower frequency servo signals effectively use the outer regions of the pole piece faces 42, 43 and therefore are not adversely affected by flux lines 40 associated with the data signals. It is believed that the AC bias supplied from source 23 during the simultaneous record and read back operation facilitates the passage of flux lines 41 in the pole pieces. Also note that in this embodiment, the longitudinal extent of the pole piece faces or tips 42, 43, respectively, of pole pieces 20, 21 are relatively long (head 13 is wideband) for facilitating this simultaneous operation. The relationship between pole face length and bandwidth is described in the article: "On Recording Head Field Theory", by J. C. Mallinson, IEEE TRANSACTIONS ON MAGNETIC RECORDING, Vol. MAG-10, pp. 773-775, Sept. 1974.

An interesting aspect of AC biasing the data signal recording while simultaneously sensing the prerecorded control signal is an unexpected increase in readback amplitude of the sensed control signal. In one set of experiments, the readback amplitude of the sensed control signal increased by about 20% with AC bias during data signal recording over readback amplitude without such AC bias. A precise scientific or technical explanation cannot be offered for such observed phenomenon at this time.

Referring now more particularly to FIG. 3, the illustrated data recorder is fully synchronized by the recorded servo signals in the various tracks T1, T2 which contain the servo or position indicating signals. For simplifying the illustration, the complex control circuits usually associated with controlling a recorder have been omitted. Such omitted circuits are well known in the recording arts.

First the circuits for detecting the sensed servo signals are described. The line 18 readback signals are supplied through a suitable low pass filter 45 which may include linear amplification. LPF 45 eliminates the data and bias signals from the servo circuits 48, 50, 51, etc. LPF 45 supplies the low pass filtered signals, each of which is preferably a single frequency sinusoid, to two band pass filters; BPF 1 for passing a signals from track T1 and to BPF-2 which passes the signals from track T2 to position detection circuits (not shown). BPF-1 may pass signals of frequency f1; BPF-2 may pass signals of f2. The ratio (f2;f1) may be between 1.1:1 and 4:1, but preferentially around 1.4:1. A position error signal PES for positioning transducer 13 and member 10 by head position servo 49 is generated by a differential amplifier network 47 which receives signals from BPF 1 and BPF 2. Differential circuits 47 can be constructed using any known PES generating signal technique. The output signal of summing network 46 goes to detector 48 which detects the signals for yielding the zero position indicator ZPI (a fiducial mark indicating a reference rotational position of a record storage disk, for example) and a sector number. For a disk, the sector number is a circumferential position address; for a tape or card, the sector number is a longitudinal position address.

The two bandpass filtered signals from BPF-1 and BPF-2 are also supplied to phase lock loop PLL 50. PLL 50 is phase and frequency synchronized to the servo signals using known phase locking techniques. It supplies its signals to a tachometer circuit 51 which then yields circumferential position indicating signals for use in any usual manner for data recording devices. PLL 50 also supplies timing signals over lead 55 to synchronize a write clock 56. It should be noted that the signals on lead 55 may have a much lower frequency than the data signal operating frequency. Write clock 56 in turn supplies data timing signals over lead 57 to a write circuit 15 which is constructed like the write circuit 15 of FIG. 1. Data to be recorded is received over a lead 58. The synchronization of write circuits, such as write circuit 15, to timing data pulses as appearing on lead 57 are well known and not further described for that reason. The bit stream supplied by write circuit 15 passes through HPF 16 and final amplifier 17, as described for FIG. 1. It should be noted that a bias source 23 may be connected directly to lead 18 rather than through final amplifier 17. The resultant recording signal on lead 18 can be termed a AC bias pulse type writing signal.

Bias source 23 can consist of an oscillator 60 which supplies a single frequency sinusoid, preferably having a frequency higher than the data signal, through an amplifier 61 to lead 18. Amplifier 61 is gated or degated by a write gate WG (generated in a usual manner), that is, bias signals are only supplied during a recording operation. Oscillator 60 can operate independently at its higher frequency. Alternatively, oscillator 60 is synchronized to the data timing pulses from write clock 56.

The above description shows a recording circuit synchronized to the buried controls signals residing in coating 12. Not only do those buried control signals provide positioning control, they also provide write timing control. Such write timing control enables a more faithful reproduction, faster recovery from signal dropouts, and the like and makes recording independent of medium speed changes.

Data recorded in track D can be recovered via transducer 13 by a read circuit 67 et al shown in FIG. 3. A readback amplifier 64 is gated to the active condition by a read gate signal RG received from the control (not shown) but known in the recording arts. The amplified readback signals can be equalized and filtered as shown in FIG. 1. Eventually the signals may be supplied to a DC restorer circuit DCR 65. It will be remembered that during recording HPF 16 removed most of the low frequency energy content from the data signals being recorded. Therefore, any DC reference is lost from the recording signals. Accordingly, DCR 65 may be employed for more faithful reproduction of the recorded signals by restoring the DC level. DCR 65 can be constructed in accordance with any known DC restoring circuit. In general, DC restorer 65 supplies DC restored signals over lead 66 to data detector 67 which converts the received signals into a data or bit stream supplied over line 68. DCR 65 may be a synchronous type DC restorer. Accordingly, the data signal on lead 68 may be fed back to the DCR 65 for this purpose.

Data detector 67 is timed by a clock circuit 70 which may be synchronized by PLL 50 as well as by DCR 65 signals from line 66. Again, clock 70 may act as a frequency multiplier based upon the timing signals received from PLL 50. Since the control signal amplitude is at least as great as the amplitude of the readback data signal and because the frequency of readback is much less, the control signal becomes a convenient auxilliary data clock 70 synchronization source. When data signals being recorded by write circuits 15 are phase-locked to the PLL 50 output signal, the control signal can synchronize clock 70. Such synchronization is important during data signal dropouts, during long strings of "0" symbols in the data stream, or in non-signal gaps between data signal blocks. For greatest accuracy, clock 70 is also slaved to the readback data signals 66, when available, as is well known.

Figure 4:
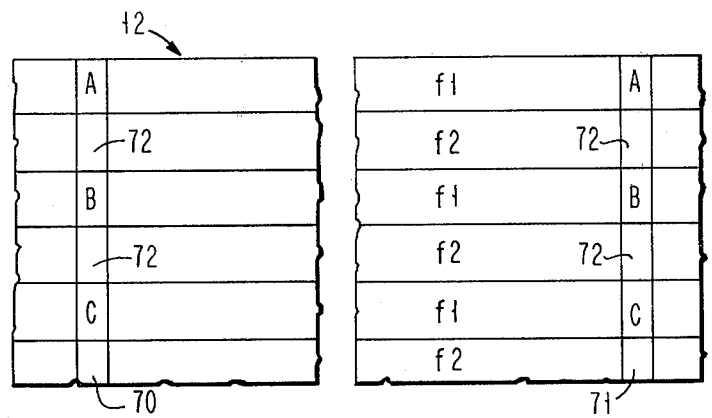
FIG. 4 is a diagrammatic showing of one signal format of the present invention.

FIG. 4 illustrates an exemplary format for use on a record medium using the present invention. A plurality of servo tracks f1, f2 are shown extending across the top of the sheet. Interleaved in the servo tracks are track identifying or address signal storing portions 70 and 71. The extent of the tracks between the identifying portions 70, 71 constitute a sector, whether it be on a circular disk or a rectangular card, tape and the like. On the odd numbered servo tracks, track and sector identification signals A, B, C are inserted in the track identifying portions 70, 71. In the intermediate or even numbered tracks, gaps or unrecorded areas are provided as at 72. Identifiers A, B, C can be a phase modulation of the sinusoid constituting the position indicating signal; i.e., such as encoding the identifier in variations of the phase of the f1 sinusoid signal. The unrecorded gaps prevent f1 from interfering with the detection of the identifiers A, B, C. Any form of signal modulation can be employed for A, B, C.

Figure 5:
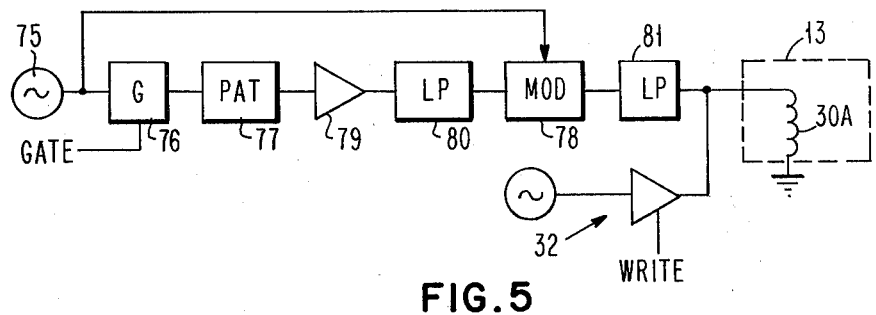
FIG. 5 is a schematic presentation of a write circuit employing the present invention.

FIG. 5 diagrammatically shows a circuit for recording identifiers A, B, C in gap 72 via a write coil 30A operatively magnetically connected to the gap 30 of the FIG. 1 illustrated transducer 13. An f1 signal source 75 supplies a single frequency signal to gate 76. Gate 76 is synchronously gated in a known manner for providing the modulation to create the identifiers A, B, C via synchronous modulator 78. The signals from source 75 synchronously time operation of modulator 78 in a known manner. The gated signals from gate 76 go to a signal pattern generator 77 which can be a "bit-deleter" or phase shifter of known design. The patterned signal stream from generator 77 is then amplified by amplifier 79 and passed through a low pass filter 80 to modulator 78. It is preferred that the filter 80 have an upper limit or roll off at or below frequency f1. The resultant modulated signal constituting identifiers A, B or C is supplied from modulator 78 through a low pass filter LP 81 to the write coil 30A. Bias circuit 32 supplies an AC bias signal to coil 30A. In the absence of receiving signals from gate 76, modulator 78 supplies a single frequency sinusoid through LP 81 to coil 30A. Filter 81 preferably has a roll off at or below twice the frequency f1.

Figure 6:
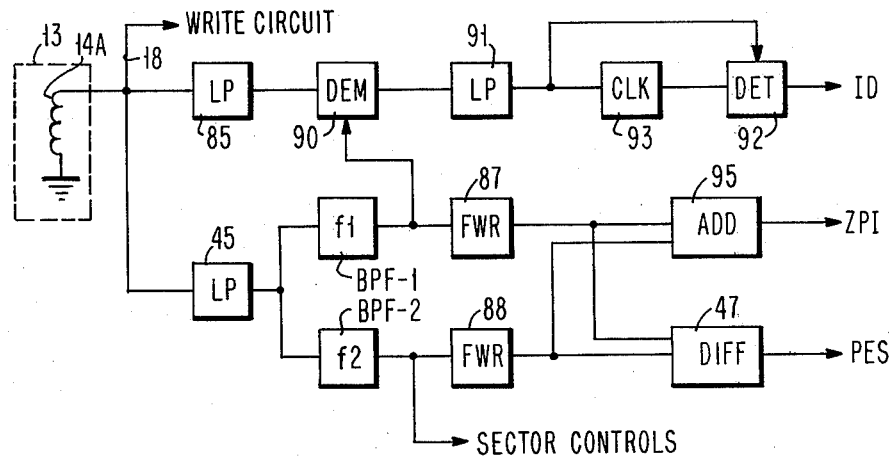
FIG. 6 is a schematic diagram of the read circuit using the present invention, and which also supplies servo signal information.

FIG. 6 schematically illustrates a readback circuit for sensing the identifiers A, B and C. Read coil 14A operatively magnetically connected to the gap 14 of transducer 13 supplies sensed signals over lead 18 to a pair of low pass filters 85 and 45. LP 45 corresponds to LPF 45 of FIG. 3. In the FIG. 6 illustrated embodiment, the output signals of filters BPF 1 and BPF 2 are full wave rectified by rectifiers 87 and 88. The output signals of rectifiers 87 and 88 are supplied to differential network 47 for generating the position error signal PES. The output of BPF 1 is also applied to demodulator 90, which synchronously demodulates the output of LP 85. LP 85 preferably has an upper pass frequency of twice f1 whereas LP 45 has a pass frequency preferably above f1 or f2, whichever is higher. The synchronously demodulated output of demodulator 90 is low pass filtered by filter 91, which may also be an equalizer. The filter signal is then synchronously detected by data detector 92 as timed by signal driven clock 93. Units 92, 93 can be constructed using known synchronous demodulation techniques. The output of data detector 92 is a bit stream ID from track f1. Each ID will identify a track f1 and one of two possible tracks f2.

Add circuit 95 receives the outputs of full wave rectifiers 87 and 88 for providing a fiducial output index pulse, or zero position indicator signal ZPI. Such zero position indicator is provided by a single gap 72 extending across all of the servo tracks (not shown in FIG. 4).

In testing all of the above techniques, it was found that track-following accuracy is greatly improved. This increase is particularly important with flexible media exhibiting biaxial anisotropic dimensional changes. Such changes differ irregularly between flexible disks such that servo control track following becomes a more severe problem. By providing a continuous servo signal underneath the data tracks, servo track tolerance is enhanced. The simultaneous recording of data and reading of servo through the same gaps at the same time enables precise data recording of very narrow and closely adjacent tracks. It also enables high fidelity readback when using the same signal for synchronizing readback in track following operations.

It also has been found that with the hard recorded position indicating signals, subsequent recording and recording of data signals using the biased pulse write technique preceded by surface erasing, the degradation of the prerecorded servo signals is avoided. The biased pulse write lessens the problem of interference with sensing the servo signals since most of the recording current is bias signal. The actual data recording signal level with AC bias is greatly reduced from the usual unbiased recording level. Further, since no signal components at the servo frequencies are needed for correct data detection, it is relatively easy to filter the exact servo frequency components out of the data write track with tuned trap filters of known design. In this way, rejection of data components at servo frequencies can be made as high as necessary for discrimination against worst case possible data patterns. The arrangement described herein makes the servo signals relatively permanent on the record medium, that is, it avoids accidental erasure from write-gap read gap 14. Since the signals are substantially continuous, the sampled data problems associated with sector type of servos is avoided. The effect of immediate dropout and separation variations is also minimized because of the continuous servo and synchronous writing operation. Because the data signals are synchronized with the servo positioning signal; depending on record member to head speed variations, the usual addition of transitions to the data signals for clock synchronization can be reduced or dispensed with.

The control signal can be used for diverse purposes, such as a security control signal, a coded reference signal and the like. No limitation to timing and position control applications is intended.

While the preferred embodiment is described, variations and modifications will occur to those skilled in the art while they become familiar with the principles of the invention. This being the case it is intended that the appended claims shall be construed to embody all such variations and modifications as fall within the true spirit and scope of this invention.

What is claimed is:

1. A magnetic recorder having a single gap magnetic transducer adapted to exchange signals with an adjacent magnetic record medium along a record track being scanned by the transducer, said record medium having a hard recorded control signal, said control signal being a narrow-band low-frequency signal, the improvement including in combination:

information-bearing signal write means connected to said transducer and including high pass frequency characteristics for supplying information bearing signals to said transducer for recording same on the adjacent magnetic medium;

AC bias means connected to said transducer for supplying an AC bias signal thereto simultaneously with said information bearing signal;

a control signal circuit having low pass frequency characteristics and connected to said transducer for receiving said control signal from said transducer while said write means is supplying said information bearing signals to said transducer; and means for simultaneously actuating said write means, AC bias means and said control signal circuit.

2. The magnetic recorder set forth in claim 1 wherein said write means includes a write clock; and said control signal circuit connected to said write clock for synchronizing operations thereof with respect to said control signal.

3. The magnetic recorder set forth in claims 1 or 2 wherein said control signal circuit further includes a differential network for generating a track position error signal usable in relatively positioning said transducer and said record medium for faithfully reproducing and recording signals.

4. The magnetic recorder set forth in claims 1 or 2 further including:

data signal readback means connected to said transducer, and control means operative to alternately actuate said data signal readback means with said write means, while simultaneously and continuously enabling operation of said control signal circuits.

5. The magnetic recorder as set forth in claims 1 or 2 wherein said information bearing signal write means includes filter means for effectively removing frequency components at and/or near the control signal frequencies to the write signals such that the signal recorded through said transducer simultaneously with the readback of said control signal does not interfere with the readback of said control signal.

6. The magnetic recorder set forth in claims 1 or 2 further including a linear track position indicating circuit connected to said transducer for generating a signal derived from said control signal which electrically indicates relative longitudinal position of said transducer with respect to a longitudinal extend of a track being scanned by said transducer.

7. A magnetic recorder set forth in claim 1 wherein said control signal circuit includes servo means for generating a position error signal in response to said control signal, position indicating means responsive to readback of said control signal for indicating a longitudinal position of said transducer with respect to a longitudinal extent of said medium, and means coupling said control signal circuit to said write means for synchronizing operation thereof.

8. A magnetic recorder set forth in claims 1 or 7 further including data signal readback means connected to said transducer for receiving data signals therefrom, filter means for restricting said control signal and including a timing base source for synchronously detecting said data, and said control signal circuit connected to said timing signal source for synchronizing the operation thereof to said control signal whereby the quality of the data readback signal can be degraded while still enabling synchronous data detection.

9. A magnetic recorder having a single gap magnetic transducer adapted to record and reproduce signals from a juxtaposed magnetic record medium by scanning a record track thereon, the improvement including in combination:

a control signal read circuit connected to said transducer for receiving signals therefrom in a first frequency domain;

a data read circuit connected to said transducer for recovering signals therefrom in a second frequency domain different from said first frequency domain in a non-overlapping portion with respect to said first frequency domain;

a data write circuit connected to said transducer for supplying a signal to be recorded in said second frequency domain;

an AC bias circuit connected to said transducer for supplying an AC bias signal thereto, said AC bias signal having a frequency above a higher one of the frequencies in either of said frequency domains; and control means for simultaneously actuating said control signal read circuit, said data write circuit, and said bias circuit to simultaneously record data signals while recovering the control signals from the record medium via said single gap transducer, and having means to simultaneously receive said signals in said first and second frequency domains for detecting same.

10. A magnetic recorder set forth in claim 9 wherein said control means includes a timing circuit synchronized to said control signal and having connections to said data read circuit and said data write circuits for synchronizing and timing the operations thereof in accordance with said control signal.

11. A magnetic recorder set forth in claim 9 wherein said single gap transducer has relatively long pole tip faces for facilitating simultaneous flux paths for flux carrying said control signal and flux carrying said data signal.

12. The magnetic recorder set forth in claims 9 or 10 wherein said signal in the first frequency domain includes modulation components indicating an address for signifying relative location of said transducer and record tracks being scanned thereby.

13. A magnetic recorder having a single gap transducer with relatively long pole piece faces as measured along a track being scanned by the transducer adapted to be placed adjacent to and facing a magnetic record medium carrying said scanned track for exchanging signals therewith;

high frequency circuit means connected to said transducer for supplying high frequency signals thereto for recording on said magnetic medium by generating magnetic flux patterns in said transducer immediately adjacent said single gap; and low frequency circuit means connected to said transducer for operating with flux paths in said transducer not adjacent to said single gap at least during predetermined times while said high frequency circuit means are supplying said high frequency signals to said transducer.

14. The recorder set forth in claim 13 further including bias means connected to said transducer for supplying a second high-frequency signal to said transducer with said signal to be recorded for enhancing operation of said transducer during readback with respect to said flux paths not adjacent to said single gap, said second high frequency signal having a higher frequency than said signal to be recorded.

15. A method of operating a magnetic transducer having a gap with a predetermined length,
   said transducer having pole pieces abutting said gap with inner portions near to and outer portions remote from said gap, the steps of:
   imposing high frequency magnetic signals on said pole pieces at least in said inner portion for recording such signal on a magnetic medium via said gap; and
   simultaneously to said step of imposing magnetic signals, sensing low frequency signals in said outer portion which are remote from said gap and received from said record medium.

16. The method set forth in claim 15 further including supplying an AC bias signal to said pole pieces for enhancing said sensing.

17. The method set forth in claims 15 or 16 further including the steps of:
   mounting said transducer for relative movement lateral to a track being scanned on a record medium bearing a signal to be sensed via said outer portion,
   servoing said transducer to said scanned track based upon said sensed signals to more faithfully record said magnetic signals on said scanned track.

18. The method set forth in claims 15 or 16 further including the steps of:
   synchronizing said magnetic signals to said sensed signals.

19. The method set forth in claims 15 or 16 wherein said sensed signals include predetermined modulation patterns for signifying a relative longitudinal position of said transducer with respect to a track being scanned thereby on a magnetic record member, further including the steps of:
   detecting said patterns; and
   adjusting said imposing magnetic signals in accordance with said detected patterns.

20. A magnetic recorder having a single-gap transducer adapted to scan a magnetic record member;
   the improvement comprising recording means, read circuit means, and AC bias means, all of said means being connected to said single-gap transducer and all said means being simultaneously active for simultaneously transferring signals to and from said transducer.

21. The recorder set forth in claim 20 wherein said recording circuit means supplies information-bearing signals to said single-gap transducer in a first higher frequency domain, and said read circuit means having a first portion for receiving signals from said single-gap transducer in a second lower frequency domain.

22. The recorder set forth in claims 20 or 21 including control circuit means connected to said read circuit means and responsive to said read circuit means to supply an electrical indication of an instant positional relationship between said magnetic record member and said single-gap transducer.

23. The recorder set forth in claim 22 including a timing signal clock connected to said control circuit means and to said recording circuit means and responsive to said electrical indication to time the operation of said recording circuit means.

24. The recorder set forth in claim 22 including a head position servo for relatively positioning said transducer and said record member and connected to said control circuit means and being responsive to said electrical indication to adjust the relative position of said transducer and said record member in accordance with said electrical indication.

25. A digital signal recorder for recording digital information-bearing signals on a magnetic record member while leaving a prerecorded signal, and with an erased portion adjacent a surface facing a recording transducer,
   comprising:
   means for receiving digital information-bearing signals to be recorded, said signals having transitions between plural successive digital signal states,
   high pass filter means connected to said receiving means for differentiating said received signals to supply a train of narrow pulses to be recorded which pulses represent said signal transitions of said received signals,
   means for supplying a substantially single frequency AC bias signal,
   linear signal mixing means connected to said filter means and said supplying means for receiving said pulses and bias signal to linearly combine same into a recording signal,
   said recording transducer positioned in a recording relationship with the record member, having a recording gap length adapted for recording signals in said erased portion immediately adjacent said facing surface and for receiving said recording signal to record same only in said erased portion.

26. The recorder set forth in claim 25 further including means operatively associated with said record member for sensing said prerecorded signal while said recording signal is being recorded, and
   control means responsive to said sensed prerecorded signal to control said recording in accordance with said sensed prerecorded signal.

* * * * *